US012318020B2

United States Patent
Burger

(10) Patent No.: US 12,318,020 B2
(45) Date of Patent: *Jun. 3, 2025

(54) EVENT FURNITURE

(71) Applicant: MACK RIDES GMBH & CO. KG, Waldkirch (DE)

(72) Inventor: Günter Burger, Waldkirch (DE)

(73) Assignee: MACK RIDES GMBH & CO. KG, Waldkirch (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,989

(22) Filed: Dec. 11, 2023

(65) Prior Publication Data

US 2024/0122379 A1    Apr. 18, 2024

Related U.S. Application Data

(63) Continuation of application No. 17/610,862, filed as application No. PCT/EP2020/063554 on May 14, 2020, now Pat. No. 11,871,857.

(30) Foreign Application Priority Data

May 16, 2019    (DE) .......................... 102019113011.5

(51) Int. Cl.
*A47F 10/06* (2006.01)
*A47B 9/00* (2006.01)
(Continued)

(52) U.S. Cl.
CPC ................ *A47F 10/06* (2013.01); *A47B 9/00* (2013.01); *A47B 83/02* (2013.01); *A47B 87/002* (2013.01); *B60B 33/06* (2013.01); *B25J 9/0096* (2013.01)

(58) Field of Classification Search
CPC ....... A47B 3/063; A47B 83/02; A47B 87/002; A47F 10/06; B25J 9/0096
(Continued)

(56) References Cited

U.S. PATENT DOCUMENTS 1,858,103 A    5/1932    Vadakkath
2,665,741 A    1/1954    Spindler et al.
(Continued)

FOREIGN PATENT DOCUMENTS

CN    101606794 A    12/2009
CN    106625695 A    5/2017
(Continued)

OTHER PUBLICATIONS

Office Action issued Jan. 2, 2024 in in corresponding CN 202080036178.5.
(Continued)

*Primary Examiner* — Jose V Chen
(74) *Attorney, Agent, or Firm* — Nath, Goldberg & Meyer; Jerald L. Meyer; Morgan D. Rosenberg

(57) ABSTRACT

The invention relates to event furniture comprising at least one table and/or at least one chair as an event furniture component (100, 200, 250, 300, 350), wherein at least one table (11, 250), a table part (120, 300, 350) of the at least one table (11), the at least one chair (110, 200), and/or a combination of the above-mentioned event furniture components have means for carrying out an individual machine-controlled movement.

20 Claims, 10 Drawing Sheets

Figure 1:
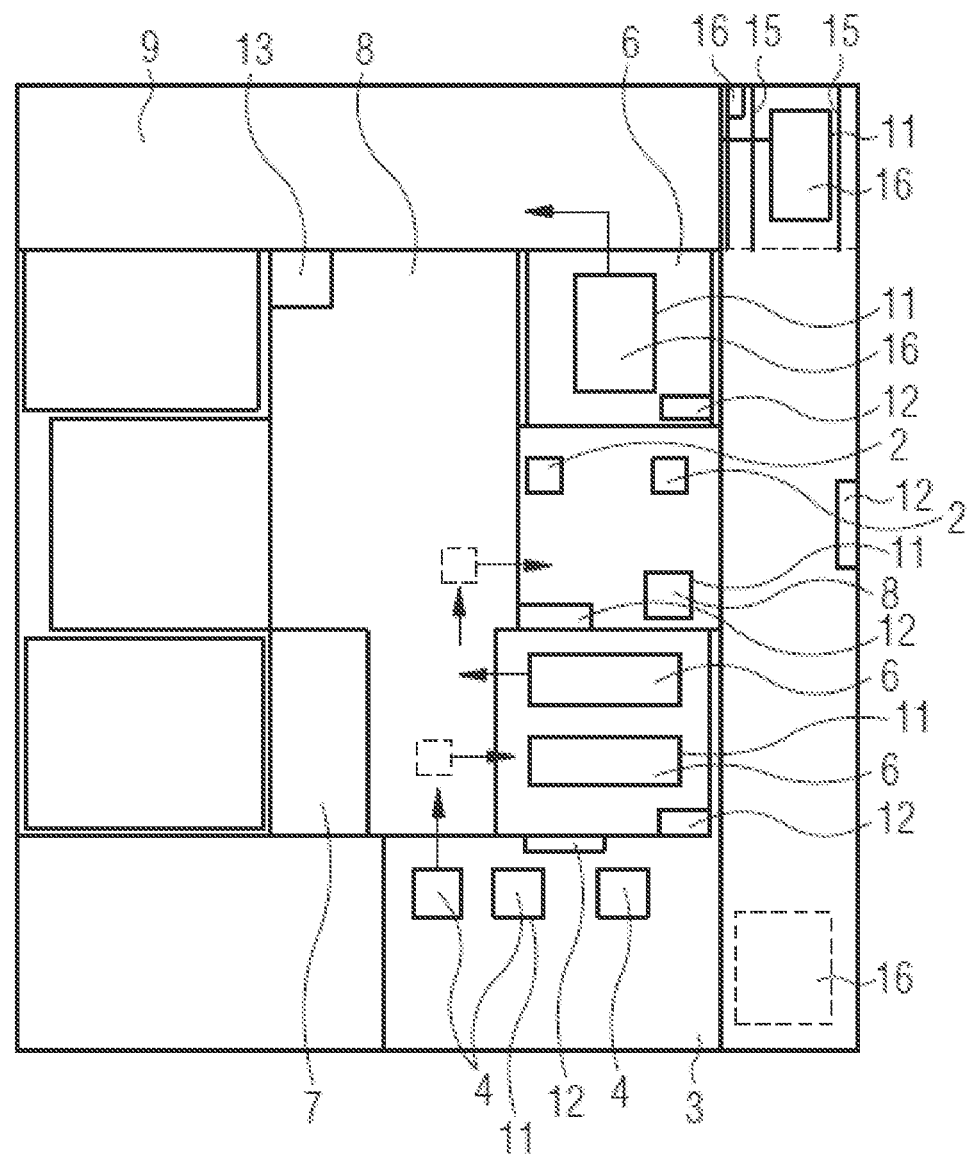

(51) Int. Cl.
  *A47B 83/02* (2006.01)
  *A47B 87/00* (2006.01)
  *B60B 33/06* (2006.01)
  *B25J 9/00* (2006.01)

(58) Field of Classification Search
  USPC ........................ 297/174 R, 135, 143; 108/60
  See application file for complete search history.

(56) References Cited

U.S. PATENT DOCUMENTS

| | | | |
|---|---|---|---|
| 2,944,861 | A | 7/1960 | Lessin |
| 3,953,091 | A | 4/1976 | Shults et al. |
| 5,547,270 | A | 8/1996 | Dang |
| 6,375,256 | B1 | 4/2002 | Rais |
| 7,901,004 | B2 | 3/2011 | Figueras Mitjans |
| 7,922,249 | B2 | 4/2011 | Marchand |
| 10,799,413 | B1 | 10/2020 | Kachkovsky et al. |
| 10,905,237 | B1 | 2/2021 | Millerbernd |
| 11,627,804 | B2 | 4/2023 | Kondziela |
| 11,871,857 | B2 * | 1/2024 | Burger .................. A47B 83/02 |
| 2010/0201165 | A1 | 8/2010 | Dankovich |
| 2011/0309659 | A1 | 12/2011 | Beauchamp |
| 2014/0285959 | A1 | 9/2014 | Riley et al. |
| 2015/0123531 | A1 | 5/2015 | Henriott et al. |
| 2015/0284088 | A1 | 10/2015 | Gow et al. |
| 2015/0375640 | A1 | 12/2015 | Yin et al. |
| 2016/0095433 | A1 | 4/2016 | Cho |
| 2016/0213148 | A1 | 7/2016 | Choi |
| 2019/0029412 | A1 | 1/2019 | Gibson et al. |
| 2019/0139368 | A1 | 5/2019 | Kogler et al. |
| 2020/0221867 | A1 | 7/2020 | Hoffman |
| 2020/0345137 | A1 | 11/2020 | Spyridopoulos |
| 2021/0212452 | A1 | 7/2021 | Colin et al. |

FOREIGN PATENT DOCUMENTS

| | | |
|---|---|---|
| DE | 102015011538 A1 | 3/2017 |
| EP | 1833331 B1 | 9/2007 |
| JP | S61-131879 A | 6/1986 |
| JP | 2012-030735 A | 2/2012 |
| SU | 17648 A1 | 9/1930 |
| WO | 2016128142 A1 | 8/2016 |
| WO | 2020229637 A1 | 11/2020 |

OTHER PUBLICATIONS

Search Report from corresponding RU 2021136987/11(077907) based on PCT/EP2020/063554.

Translation of Decision of Rejection in JP 2021-568051 issued Dec. 19, 2023.

Parallel pending Japanese patent application No. 2021-568051, issued on Apr. 4, 2023, with English translation.

Office Action dated Apr. 27, 2020, issued in corresponding German application 10 2019 113 011.5.

* cited by examiner

EVENT FURNITURE

The invention relates to event furniture having the features of the preamble of claim 1.

Nowadays, participation in social life events is associated with ever greater expectations and a pursuit of experiences that go beyond the event itself. For example, a visit to a restaurant is increasingly no longer seen purely as an activity for the purpose of consuming food and, as the case may be, for the purpose of a social get-together; it should at the same time represent an entertaining experience. Accordingly, there are more and more offers in the field of experience catering that couple such an experience with food. In the most basic case, this can be done in the context of a themed restaurant, where the furnishings, the menu, but also the waiters' outfits are adapted to a specific theme.

In addition, very popular formats such as "crime dinners", Witzigmanns Palazzo and Schuhbeck's Teatro have developed, in which the meal is framed or embedded in a play or show event.

Another popular approach is for parts of the usual process in a restaurant to be carried out in an unusual, extraordinary way. One step in this direction is show cooking, in which the food is prepared right in front of the guests. Wait staff performing stunts is also known. Another variant belonging to this category is the well-known roller coaster restaurants, which are also described in EP 1 833 331 B1 and DE 10 2015 011 538. In these restaurants, the traditional serving process is replaced by transporting the ordered food and drinks to the tables under the eyes of the guests via a roller-coaster-like rail system, with the loading of said rail system by robots or robot arms being partly visible to the guests.

What the previous concepts have in common, however, is that the guest is substantially statically arranged in a room during the event and, if necessary, in some exceptional cases, e.g., if the room is arranged on an excursion boat or in the case of a dining car on a train, the room itself moves. There is therefore a need for event furniture that opens up a new dimension of experience at an event, for example a restaurant, café, or bar visit, but possibly also a meeting or a cultural event.

The object of the present invention is therefore to provide event furniture of this kind. This object is achieved by event furniture with the features of claim 1. The dependent claims relate to advantageous further developments of the invention.

As is generally customary, the event furniture according to the invention has at least one table and/or at least one chair as an event furniture component. At this point it should be emphasized that the table and chair do not necessarily have to be present; one need only think of standing restaurants or chairs with integrated storage space.

It is essential to the invention that the at least one table, a table part of the at least one table, the at least one chair, and/or a combination of the above-mentioned event furniture components have means for carrying out an individual, machine-controlled movement.

In this context, a machine-controlled movement is understood to mean driven movements which are at least not directly controlled by a user of the event furniture component, even if they may be influenced thereby, e.g., by means of an emergency braking or indication of a desired destination which is then approached in a manner not subject to the direct control of the user. For example, a machine-controlled movement can be realized using technologies that are used in driverless transport systems.

It should be noted in particular that the presence of means for carrying out an individual, machine-controlled movement does not preclude additional means for carrying out a movement controlled by guests themselves, it also being possible for parts of these means to be used for both purposes. In fact, according to a preferred development of the invention in particular, the event furniture additionally has operating elements for influencing the movement by means of the guest, for example pedals, drive rockers, hand levers which act like vertical rudders, or the like.

Within the meaning of this disclosure, a machine-controlled movement is "individual" when a machine-controlled movement of different event furniture components can be different at the same point in time. Conversely, machine-controlled movements in which the relative position of the event furniture components does not change are thus not individual machine-controlled movements.

Even if specific configurations of means for carrying out an individual, machine-controlled movement are presented in more detail below, it should be pointed out at this juncture that such means within the meaning of this disclosure are already present if interaction with other event furniture parts, in addition to the corresponding event furniture part, is necessary in order to perform a movement.

For example, it may be sufficient to provide only one coupling element for coupling to a drive system provided outside the event furniture component, for example a magnetic coupling to a magnetic transport system or a mechanical coupling to a conveyor chain; the drive therefore does not necessarily have to be fully integrated into the event furniture part in order for said part to have means for carrying out an individual, machine-controlled movement. A coupling to an externally provided controller may also suffice, for example control signals wirelessly transmitted to a drive system that is partially integrated into the event furniture so that even though local control is possible and useful, but not necessary, for a number of applications the feature of having means for carrying out an individual, machine-controlled movement is satisfied.

By virtue of these features, the event furniture according to the invention allows the environment to change in a surprising and unpredictable manner for the guest using said event furniture component. For example, with a suitable configuration of the event furniture components, different parts of the meal can be taken in different areas of the restaurant, the serving process can be reversed by transporting the guest into the kitchen and giving them their food there, or the seating arrangement at the table can be varied.

In this way, if the restaurant is suitably equipped, stories or trips can be staged, while the guest is eating, in a way that has hitherto not been achieved. At the same time, if implemented in a suitable way, this can also be used to mix guests during a celebration, such as a dating event, in a similar way.

In an advantageous development of the invention, the event furniture has a table that is composed or can be composed of a plurality of table parts and chairs assigned to said table, this event furniture component preferably has means for carrying out an individual, machine-controlled movement on each of its components or on combined groups of components forming an event furniture component. This makes it possible to vary the size of the table, but also to vary the table neighbors during the restaurant visit. For example, a large common table can suddenly split apart and reconfigure itself into a plurality of smaller tables.

This can solve one of the general problems of occasions where many people enjoy a multi-course meal around a common table because, while until now one had to make small talk with the same more or less interesting fellow human beings throughout the evening, it is now possible to mix people up by means of automatically initiated seat changes.

In particular, however, in the practice of a restaurant visit, it is generally desirable to maintain a unique assignment of food and drink to a customer or guest. It is therefore preferred that some table parts or all table parts are each connected to at least one of the chairs assigned to the table in such a way that the table part and the chair connected thereto form a unit which can be moved together in space and then the unit can be understood as an event furniture component. These units or event furniture components accordingly have the means for carrying out a machine-controlled movement. This then means that the table parts and the chairs connected thereto can be reconfigured to form a plurality of tables or a table composed in a different way.

In particular, this can be done by arranging a plurality of components on a common base plate, which then has the means for carrying out the machine-controlled movement.

Even when using such event furniture components, in order to ensure that the arrangement of the chair relative to the table part is still variable, which is desirable both for seating comfort and taking a seat and, finally, in cases in which the meal is accompanied by an animation—to ensure an optimal perspective on what is being seen—it is preferable in the case of at least one event furniture component, for a chair to be arranged such that it can move relative to the table part, for example by arranging the chair and the table part on a common base plate comprising a guide or bearing in which the chair moves, in particular can be slid, can be rotated, and/or is height-adjustable. In particular, an adjustment option can be provided here which allows users of the event furniture to set a position themselves that is ergonomically comfortable for them.

It may be particularly preferred in this case if the movement of the chair relative to the table part contains a driven component, alternatively or additionally in the case of at least one event furniture component, and that drive means for this movement are arranged on the event furniture component. Firstly, a more comfortable, for example electrically driven, adjustment can be made possible in this way. Secondly, if these drive means are implemented as mechanical drive means controlled by a controller, the situation can be influenced again, e.g., by the chair of the guest in question being rotated in a specific direction, in which something is happening in the animation framing the meal, said chair being raised, or even a vibration being stimulated, which can then also be used to accentuate events of the accompanying animation or experience story. For example, the tremors of an earthquake, a collapsing house or an approaching giant dinosaur can be represented even more realistically.

If at least one chair and/or at least one table of an event furniture component on the event furniture component is connected to the event furniture component via a quick coupling, said event furniture components can be quickly replaced by other, identical or different types of event furniture components. This may help, for example, to make it possible to adjust the animated restaurant quickly when changing the theme of the restaurant—for example, from a space trip to a Wild West adventure—or to adapt it to events for different age groups, for example an afternoon birthday party for children which is to be followed by a dating event in the evening.

Another unusual experience can be generated if there are two or more table parts which can be positioned so as to partly overlap one another in at least one configuration of the event furniture. This makes it possible, for example, to have a table that has guests sitting on it initially slide apart virtually imperceptibly, as a result of which space is created in the center of the table for other effects produced from above or below in the central area, it being possible to use said effects to create surprise.

It has been found to be an advantageous further development of the invention that at least one sensor is arranged on at least one table and/or on at least one chair, which sensor is configured and designed to detect the presence, the current position, and/or a movement of a guest or to detect the presence, the current position, and/or a movement of another event furniture component. This sensor system can be advantageous in particular for safety reasons. For example, in this way, it can be detected when a guest of the animated restaurant leaves their place and a movement of the corresponding event furniture component can be adequately adapted, e.g., gently stopped.

It is also very useful to monitor the docking processes of different table parts to one another by means of sensors and, if necessary, to intervene in the mechanical movement or to trigger special (show) effects. For example, a virtual protective jacket with different safety zones can be placed around event furniture components in order to safely and efficiently regulate the traffic and coupling processes, it being possible for e.g., speeds and driving forces to then be reduced as a precaution if another event furniture component or other object is located in the safety zone. However, as an additional effect in the critical and final coupling process, for example, red colored or red illuminated mist could be emitted and/or a sound effect could be output or an area could be vibrated when touched. The corresponding zones should be freely programmable.

There are a large number of possibilities for the specific implementation of such a sensor system. For example, interface scanners, pressure sensors, IR sensors, or optical sensors can be used to implement the system.

It is also advantageous if at least one user interface is arranged on at least one table and/or on at least one chair, for example to allow a guest to influence the mechanical movement and/or to carry out ordering processes. It is also advantageous to additionally or alternatively provide a display for displaying information. Such a user interface can then be designed, for example, as a touch panel or also as a special tablet PC that is integrated into the event furniture component in question and is in signal communication with an external controller that further processes the user's wishes.

Apart from the possibility of providing the food and drink offering and placing orders, information can also be presented here as a basis for decision-making for the further progression of the restaurant visit and preferences of the guest for the further progression of the restaurant visit can be queried.

For example, if the meal is embedded in an animated adventure story, a plurality of continuation possibilities could be put to the vote such that, depending on the outcome of the respective votes, in the case of a repeated visit to the restaurant different stories are experienced each time even if the themed adventure story is the same. However, it could also be possible, for example in the context of a dating event, to enter preferences for the participant to whom one would like to sit near during the next course, possibly supported by brief information on this information, which can be called up via the display. In this scenario, the preferences of all guests could then be evaluated by a central controller, an optimized seating arrangement could be calculated based thereon, and the guests could be transported there by their event furniture components. A similar concept can be used when organizing family celebrations to ensure that every family member has the most positive experience possible.

It is particularly advantageous if at least one device for sensory stimulation of a guest sitting at the table and/or the chair is arranged on at least one table and/or on at least one chair—regardless of whether the table or chair forms an independent event furniture component or is part of a unit that represents the independent event furniture component. This device for sensory stimulation of a guest can be implemented in a wide variety of ways.

Firstly, visual stimulation is possible, which in the simplest case can be achieved by providing content on a screen. Another type of visual stimulation is projection onto a surface, for example a table surface. With the means of modern projection technology, it is possible to create virtual objects on such a surface that can appear deceptively real. In this way, for example, if embedding the restaurant visit in an "Expedition in Africa" theme, a stream of giant ants can appear to run across the table. A projection of this kind can also obscure, for example, that an object has actually disappeared from the table by replacing it with its projection. Other types of visual effects can be achieved by adapting the lighting, using false smoke, producing confetti, and similar arrangements.

Secondly, acoustic stimulation is possible. In addition to the pure reproduction of content via a locally arranged loudspeaker, acoustic stimulation can also be realized with a significantly more complex sound system that produces specific sound effects based on input from a higher-level controller or based on input from read-out sensors. For example, the seating position of the chair on which the guest is sitting could be monitored and a creaking sound played with every movement or a drinking process could be identified with camera monitoring and then accompanied by loud drinking noises.

Another highly interesting alternative, when embedding the event in a narrative framework, is to locally output different information via the relevant loudspeaker, for example allowing conversations to be listened to in some positions in the room, but not in others. In this way, "crime dinners" for example can be made even more interesting and guests can be encouraged to visit the same event several times in order to relive the story from a different perspective.

Thirdly, olfactory stimulation is possible by delivering locally targeted aromatic substances. For example, a smell of fire can significantly intensify the experience of a fire in the adventure story with which the restaurant visit is animated, or, if the story is taking place at sea, an attempt can be made to recreate the smell of saltiness associated with the sea in an olfactory way. If the animation also involves personnel and/or actors, their appearance can also be accompanied by smells, for example by giving off an intense smell of rum when the pirate captain walks past the table.

Fourthly, haptic stimulation can also take place, for which there are a large number of possibilities for implementation. Vibrations with which an event can be accompanied have already been addressed. However, blowing hot air through a fan from the direction of a fire shown in the animation or from the mouth of an animal that appears to be passing by, for example a projected animal, can also provide very impressive effects. Liquids can also be used successfully here, for example by means of spraying devices.

In a preferred development of this embodiment, the device for sensory stimulation is operated in synchronization with the machine-controlled movement in order to produce a coherent overall experience. This is possible in particular if a local controller of devices at the table and/or a controller for moving the table (which can also be the same local controller at the table as the controller of devices) interacts with a higher-level control and/or navigation system. Such an interaction is, however, also explicitly regarded as independently advantageous outside of exemplary embodiments of this development or of the further developed embodiment.

Furthermore, it has proven to be advantageous if an external controller for controlling the individual machine-controlled movement is present. This is preferably a higher-level controller which not only controls the machine-controlled movement of an event furniture component by transmitting suitable control commands to the drive system, but the external controller coordinates and/or synchronizes the individual machine-controlled movement of a plurality of event furniture components, e.g., a plurality of tables, a plurality of table parts of the at least one table, and/or chairs. Accordingly, the controller preferably also has a navigation module which can determine the target position and preferably also the actual position of the event furniture components at any time or communicates with such a navigation module.

In particular, if a global device for sensory stimulation is also present, it is advantageous if said device is also controlled by the external controller.

For safety reasons, and to ensure orderly operating processes, it is advantageous for operating devices which are in signal communication with the external controller and allow intervention in the procedures of the external controller to be available to event employees. Technically, this can be realized, for example, by a wireless connection as well as by a connection "by wire", i.e., a wired connection. Advantageously, these operating devices have confirmation and/or manipulation keys which can be used to start, stop, or interrupt program sequences, or change them in a predefined way such that only a single key press or a few key presses are sufficient to control and/or influence even complex processes.

In this way, visual control can be provided in addition to technical safety functions. If the relevant employee sees, for example, that a guest is endangering himself/herself or others, a gentle stop or emergency stop can be brought about with a key press. If, for example, the employee notices in the above-mentioned example of a projection of giant ants that a guest is panicking due to a phobia of ants, the projection can accordingly be deactivated at this specific table. In this way, a smooth and harmonious progression of the event can be ensured.

Another technical possibility for providing the above-described functionalities is a voice control system, by means of which—possibly by using special speech codes in order to avoid random triggering—security functions and/or show commands can be triggered or activated. Such a voice control system can also be used in interactive formats to allow guests to participate.

According to a further advantageous development of the invention, the event furniture further comprises at least one buffet device which has means for carrying out an individual, machine-controlled movement which can be realized in the same manner as the individual, machine-controlled movements already discussed.

In this context, a buffet device is to be understood, in particular, to be devices on which prepared food is provided for consumption; it can therefore also be a sushi belt, for example. An example of a scene of the animation that can be designed in this way is the replacement of the actual serving process: one sits waiting for the food at the table, which suddenly divides while the corresponding buffet device moves out of the kitchen and positions itself in the middle of the table, before the table parts are docked to the buffet device. Another possible variant is that the food effectively "flees," i.e., moves away with the buffet device and must first be "caught up" or "hunted" by the respective chair-table-part units.

Another event furniture component that can be used advantageously is a wall, partition, or privacy element which has means for carrying out an individual, machine-controlled movement which can be realized in the same manner as the individual, machine-controlled movements already discussed. Said event furniture component can also fulfill a variety of functions. Firstly, they can be used in a conventional way to create privacy, in particular in scenarios with large tables that split up into individual tables, or they can be used at a dating event if a guest has found a supposed dream partner who they want to take off the market, so to speak. Secondly, they can serve as an additional projection surface or as a source for sensory stimulation furniture that is mobile in space. However, it can also be used as an excitement-enhancing element in the form of an obstacle that only disappears at the last minute, when a collision seems virtually inevitable.

Another advantageous type of event furniture component is a docking station for supplying other event furniture components which have means for carrying out an individual, machine-controlled movement with energy and/or operating material, for example compressed air or components of special effects such as liquids, confetti, or the like.

An advantageous embodiment of the means for carrying out the individual machine-controlled movement comprises at least one air cushion, which enables a particularly low-friction movement across the ground. In this case, it is advantageous for the air cushion to have a sealing element comprising a main body and comprising a sealing lip which is arranged movably on the main body such that it is pressed against the floor when the air cushion is activated. Alternatively or additionally, the air cushion can have a separately inflatable support ring with a sliding lining and optionally one or more additional sealing ridges.

Alternatively, however, the means for carrying out the machine-controlled movement may also include a magnetic system, a rail system, or a conveyor chain system which allows movement across the floor of the restaurant.

Furthermore, in order to provide the driving forces, it is particularly preferred for the means for carrying out the machine-controlled movement to comprise at least one friction wheel or Mecanum wheel, wherein it is particularly advantageous if there is more than one friction wheel and if, when controlling the machine-controlled movement, the friction wheels or Mecanum wheels are coupled with the software and can be controlled as desired. In this way, maximum mobility and maneuverability in a confined space is made possible. In order to facilitate an adaptation to different floor coverings, it is advantageous if friction wheels or Mecanum wheels that are present are height-adjustable.

Preferably, a drive system or an energy supply or a local controller or a combination of these assemblies is provided on at least one component of the event furniture comprising means for carrying out an individual machine-controlled movement.

Another optional but advantageous event furniture component is a robot arm or robot that can be attached to a rail system fastened to the ceiling of the restaurant, for example. This can perform serving processes, interact with guests, or take orders.

Such interaction can be made particularly interesting if the robot or robot arm is equipped for interaction with a bust onto which faces can be projected. These can be, for example, the faces of famous personalities, but also other images, e.g., from photos or videos that were taken in advance by relatives or friends. Preferably, the voice of the robot or robot arm is also adapted accordingly. In such a case, for example, the robot arm can approach the guest, and the guest is asked by a face that looks like that of the guest's mother, and in her voice, what the guest wants to eat or where they have been hanging out.

Such a robot arm or robot can alternatively or additionally also ensure the movement of the event furniture components by setting the drive system or taking over the control of the drive system. To this end, at least one component of the event furniture with means for carrying out an individual machine-controlled movement should preferably have an interface for interacting with a robot arm or robot.

In specific terms, this can, for example, look like a robot arm engaging a protected section in a form-fitting and frictional fit and thus either steering the drive system for the movement or directing said movement with navigation forces. Of course, the robot or robot arm can also provide the control pulses, for example by operating a joystick or non-contact signal transmission, for example by means of near field communication. The latter in particular can give the impression that the movement is carried out as if by magic.

In particular, moon walk scenes can be realized in which, for example, a robot coming from the ceiling pulls the table and slight speed changes (acceleration and braking) are also physically perceived.

Larger robots can also be used as event furniture components, which can then move, for example, a complete buffet module, a guest, or a guest together with the event furniture component on which the guest is arranged.

If there are a plurality of event furniture components in the form of robots, it is also possible to have the robots interact with one another, for example by forming a chain along which event furniture components or food items are passed or in a robot-on-robot configuration, in which, for example, a larger robot carries a smaller one which then serves, or vice versa.

It is also conceivable to give the guest the opportunity to interact with another guest via an event furniture component in the form of such a robot or a drone, for example to have a rose brought to a beloved lady at a dating event.

In particular, in order to make this possible, it may be advantageous if identification features such as number codes are arranged on the event furniture components. By means of a corresponding input to an input unit arranged on its own event furniture component, a type of contact can then be brought about, e.g., by a vibration of a chair, accompanied by a rotational movement, transmission of a short text message to a display of another event furniture component or a pointer which—possibly also from another event furniture component—is extended or can be moved to draw attention to the source of the contact.

Another advantageous possibility for creating such identification features which can also be used at the same time for providing and transmitting information is to provide event furniture components with RFID modules.

Figure 2:
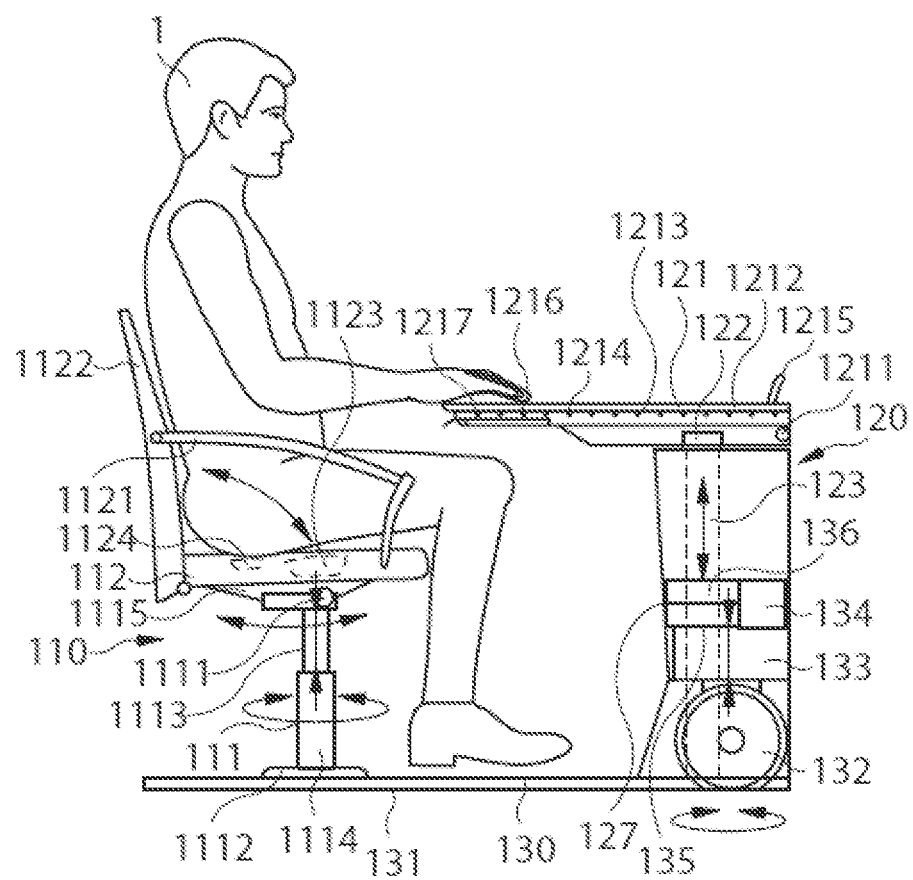
Figure 3:
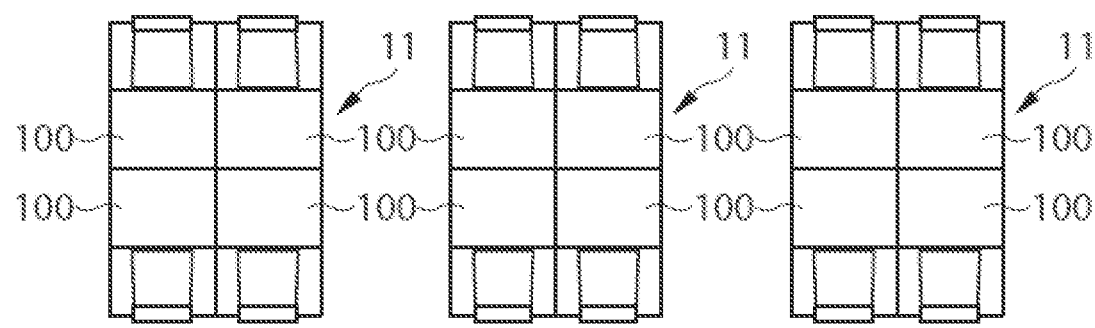
Figure 4:
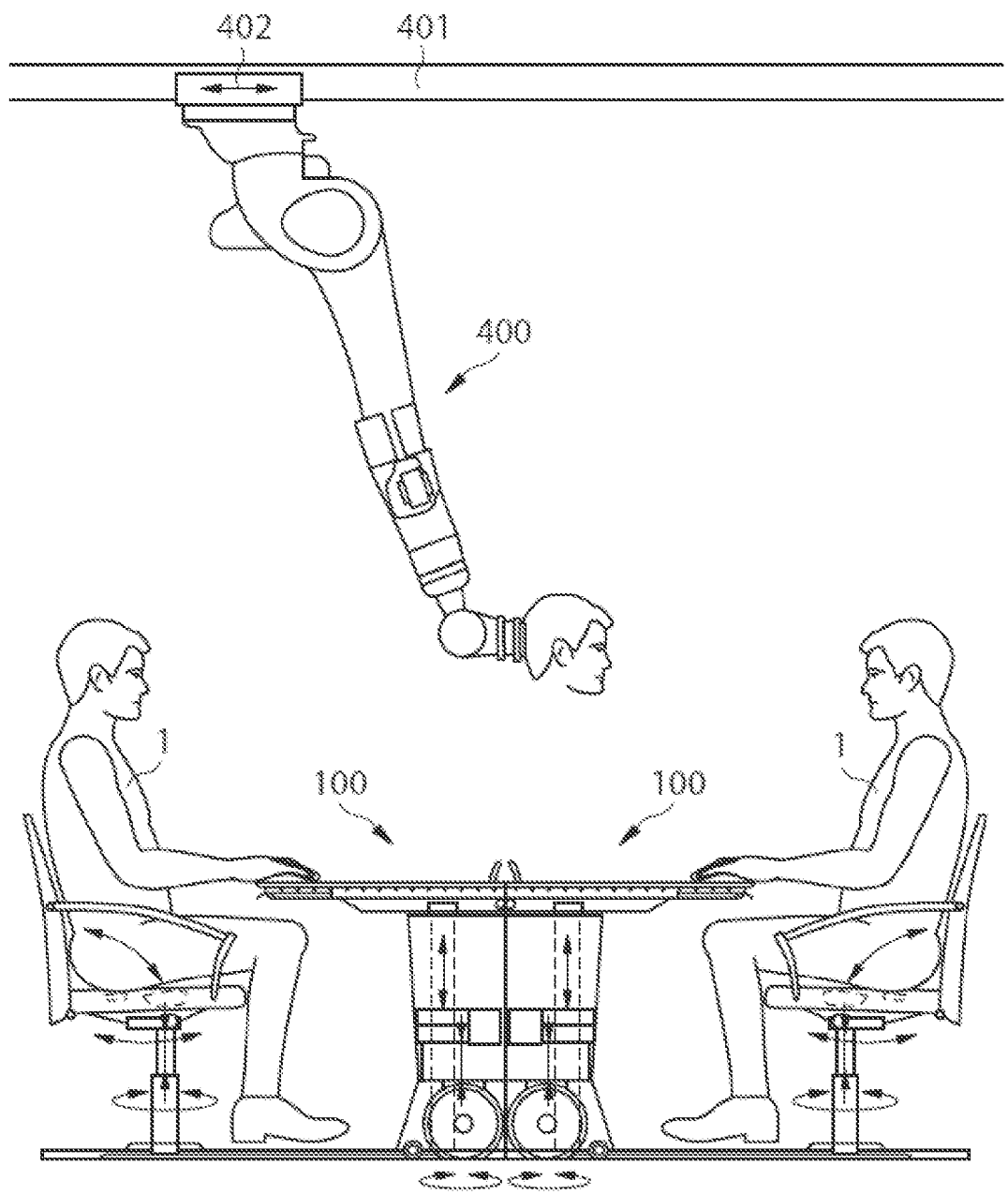
Figure 5A:
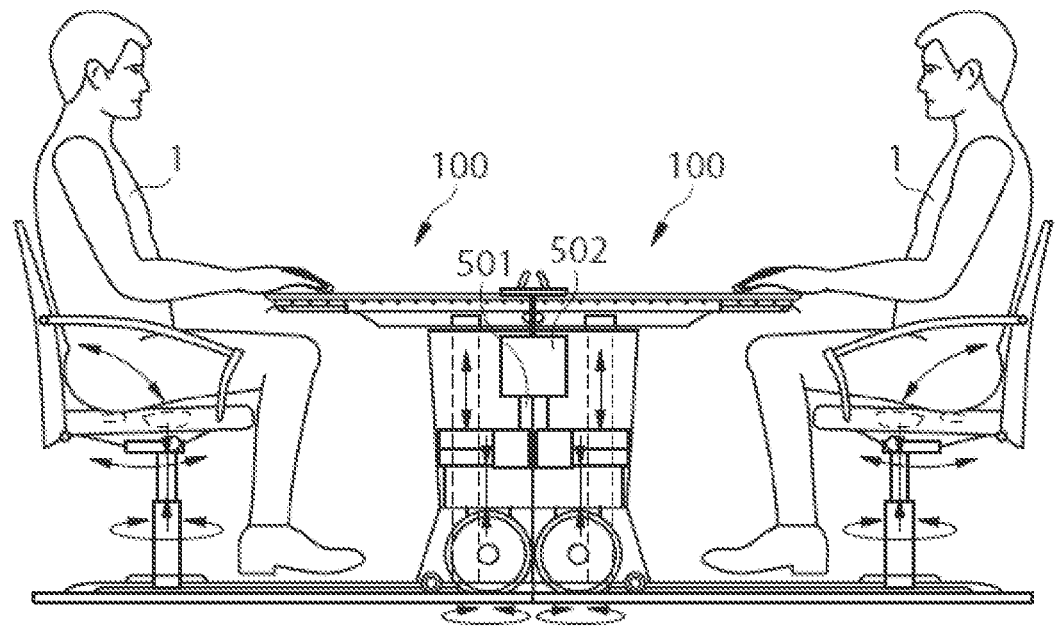
Figure 5B:
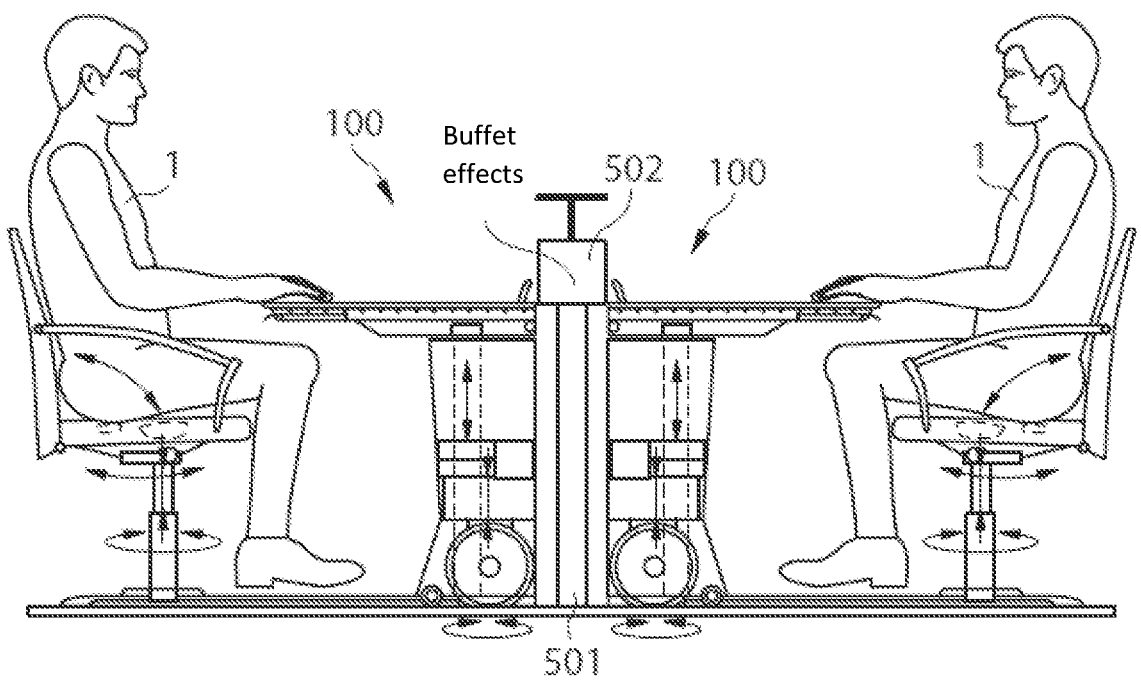
Figure 6:
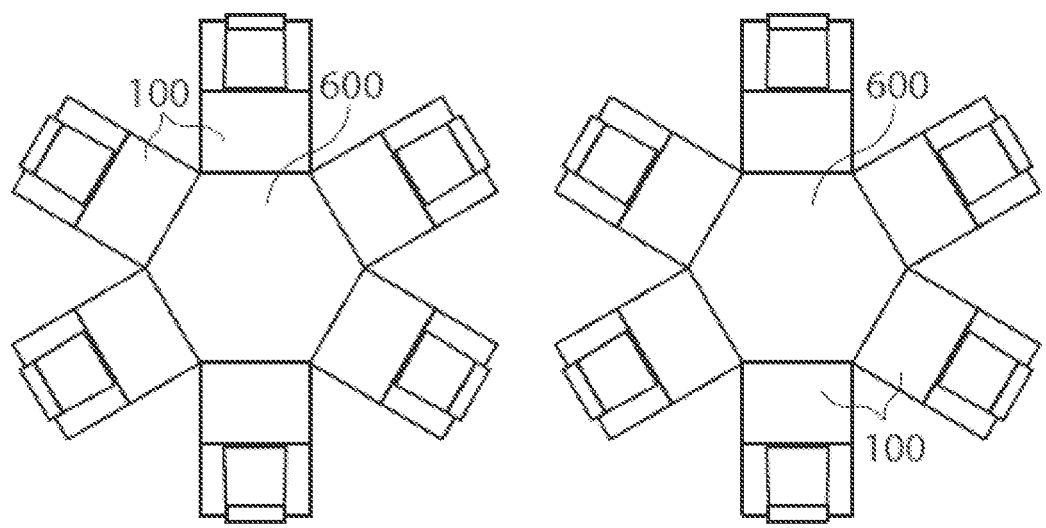
Figure 7:
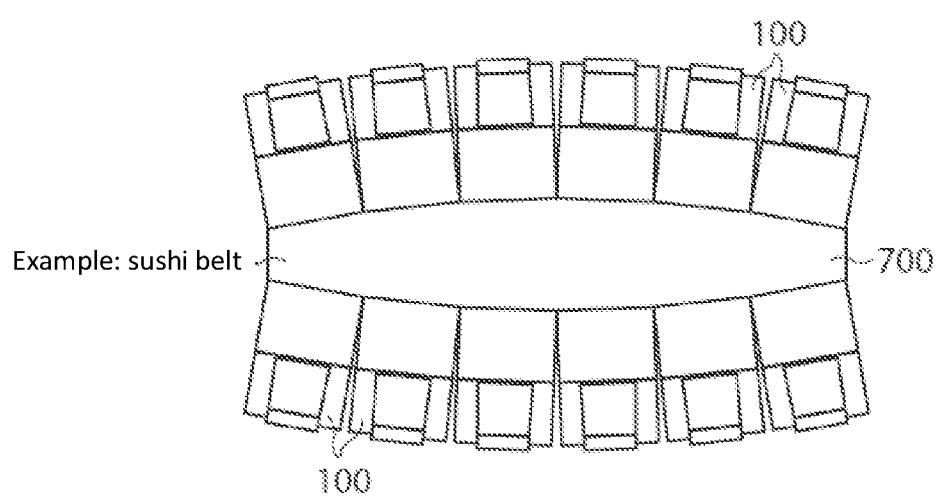
Figure 8:
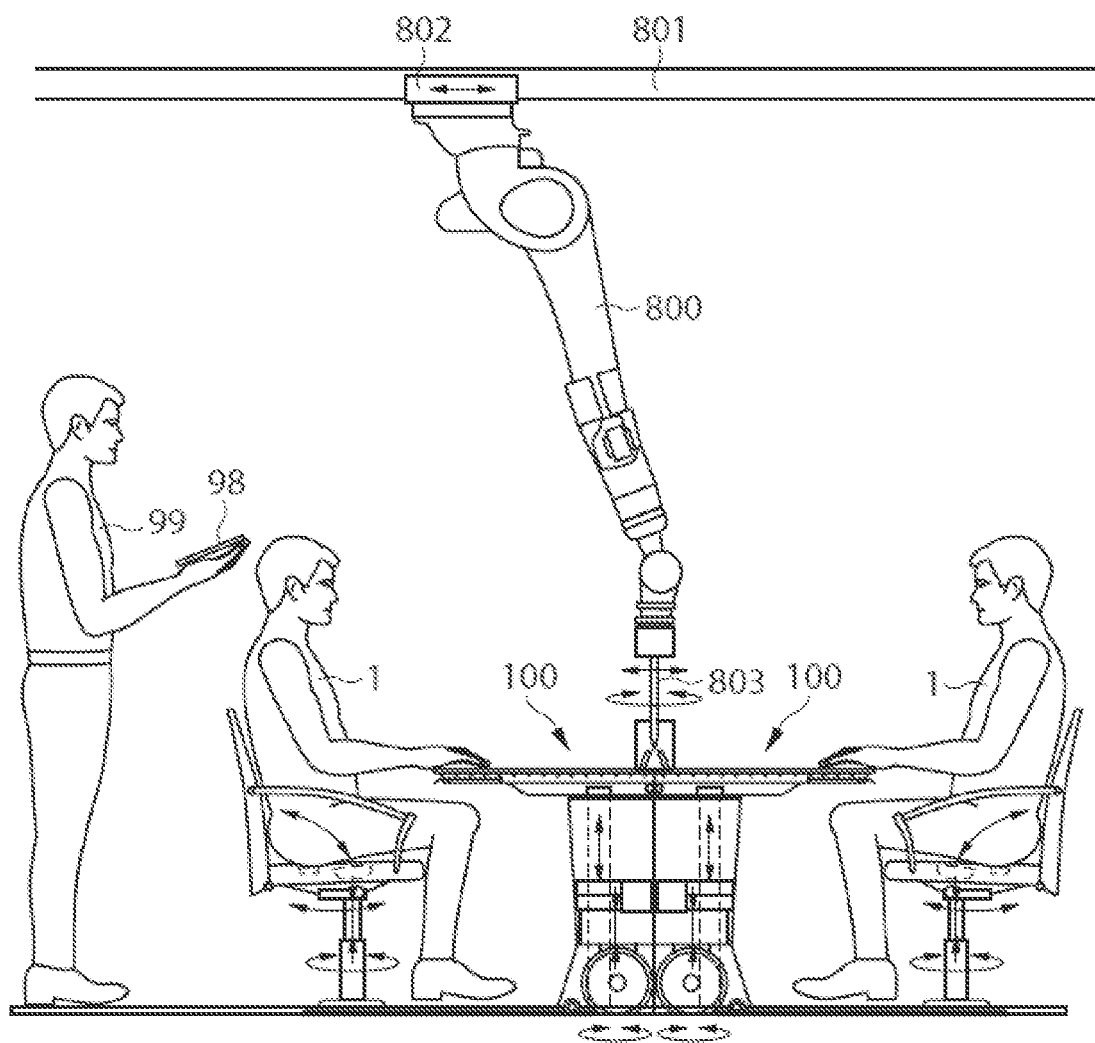
Figure 9:
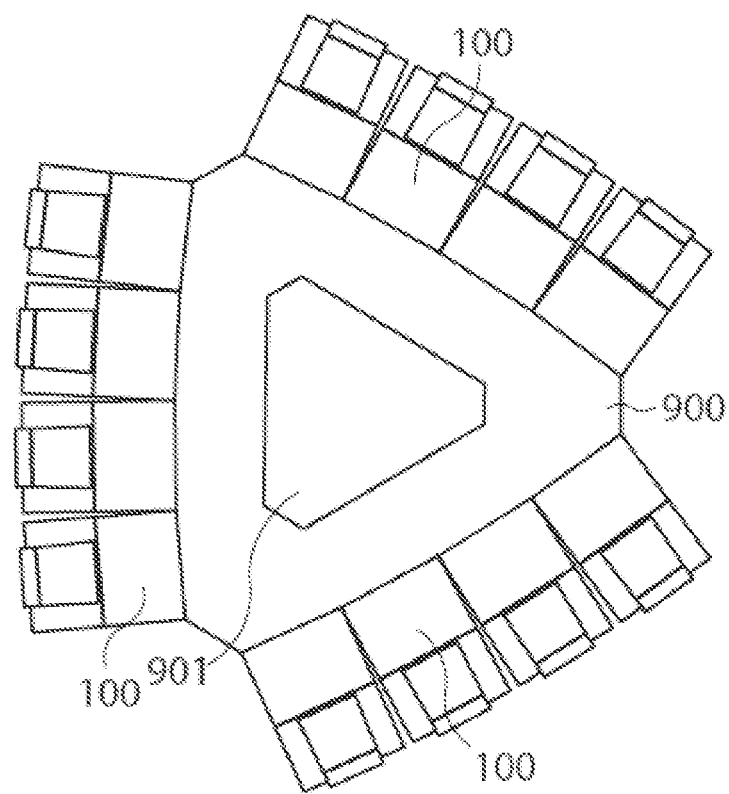
Figure 10:
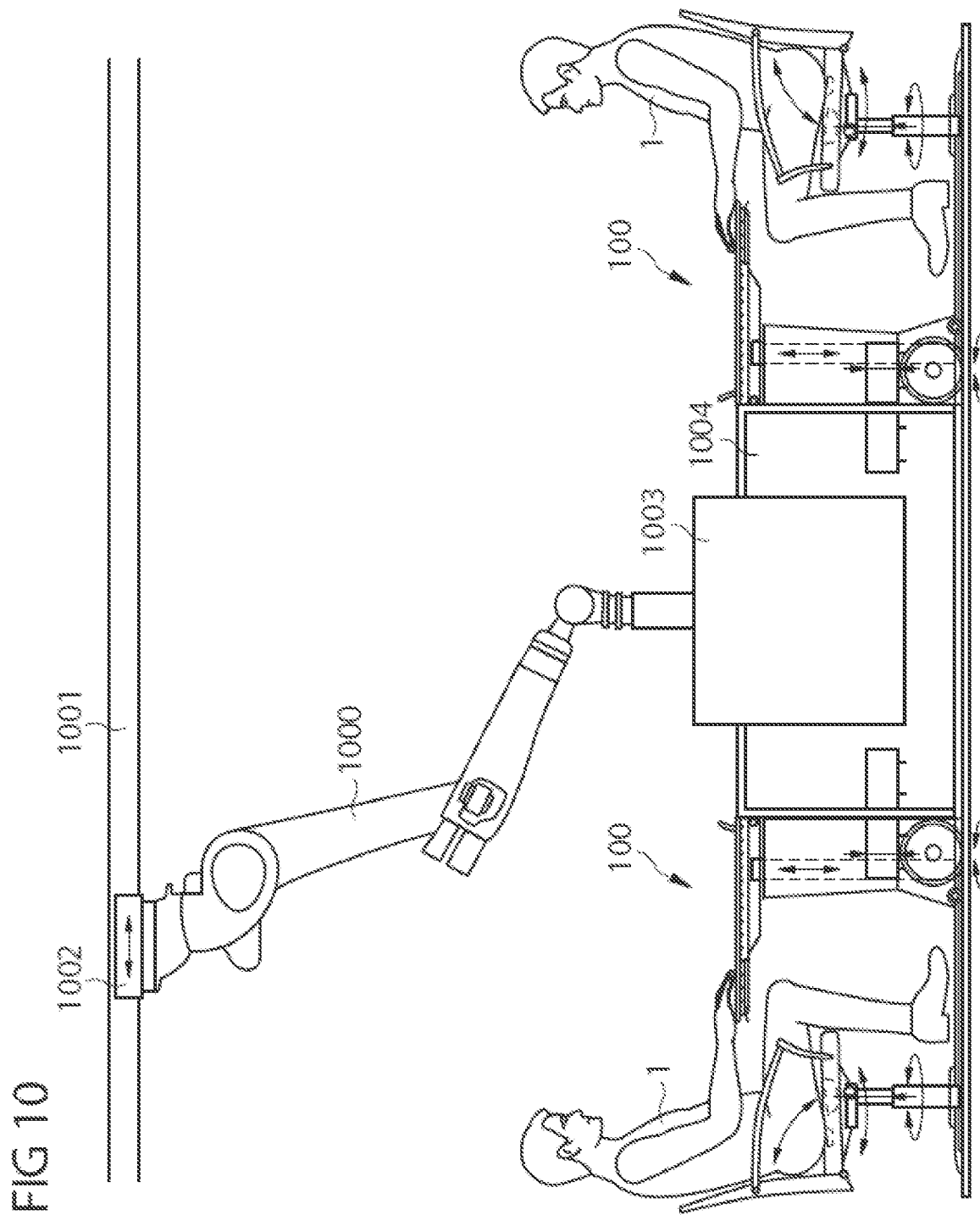
Figure 11:
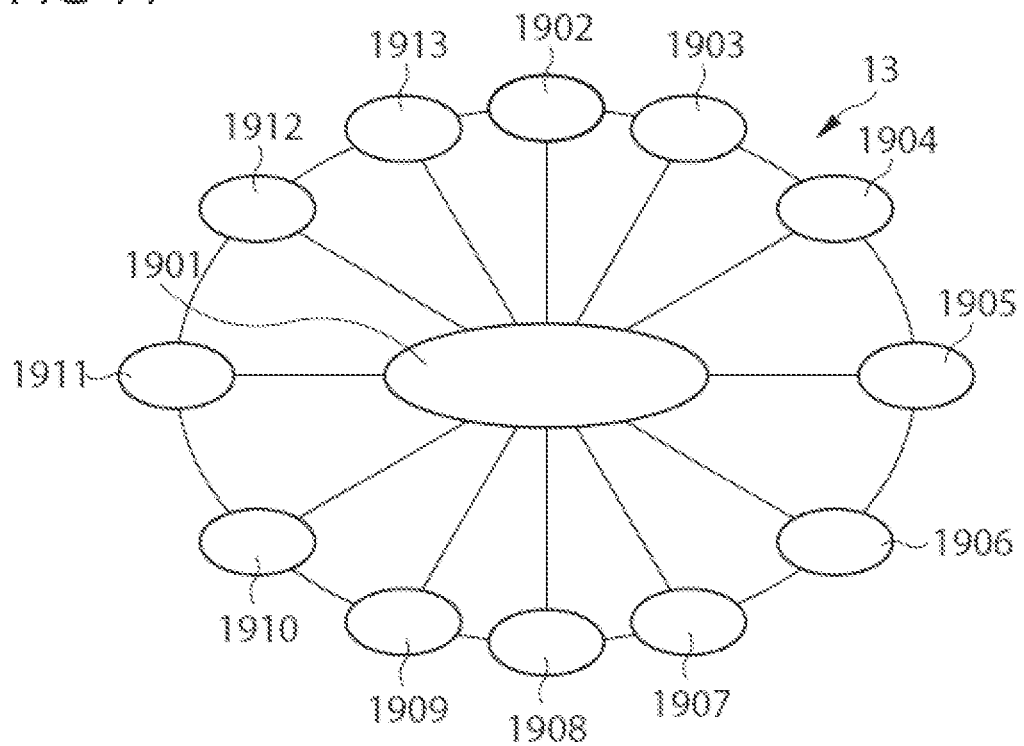
Figure 12:
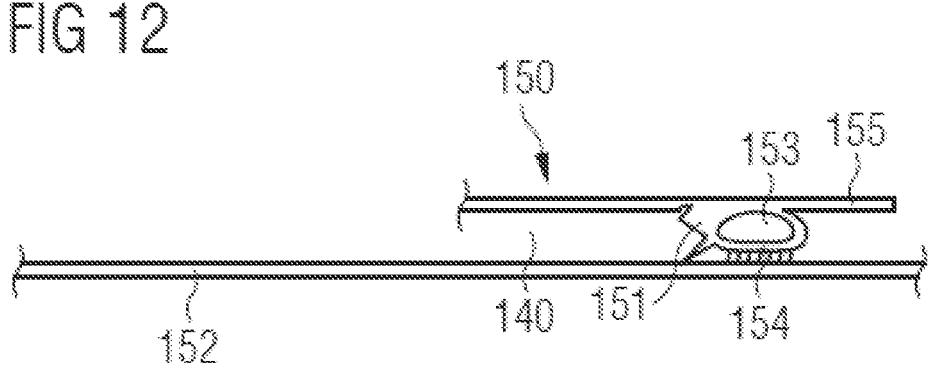
Figure 13:
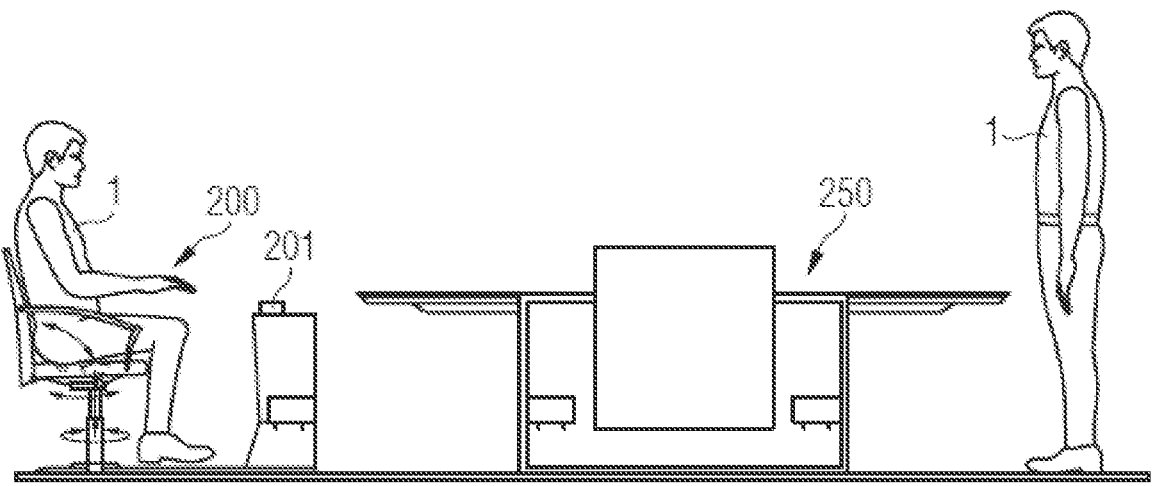
Figure 14:
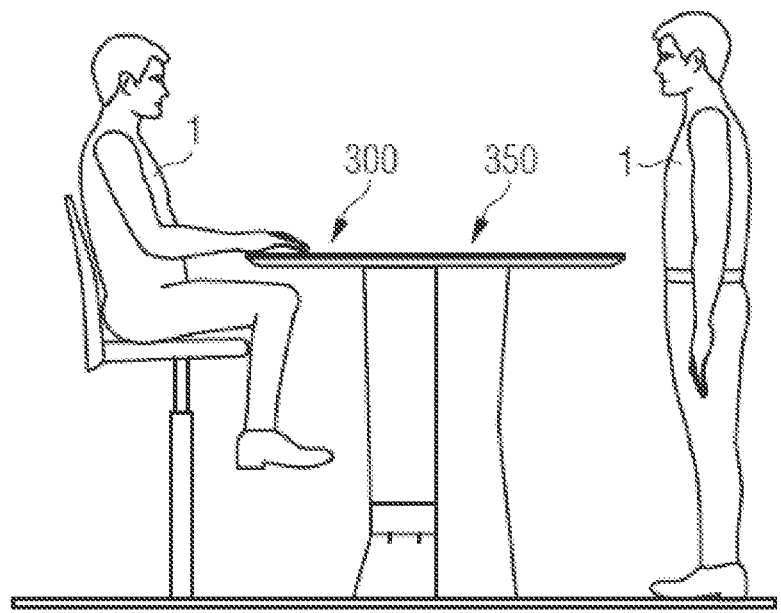

The invention is explained in more detail below on the basis of figures representing exemplary embodiments. In the drawings:

FIG. 1: shows a plan of an example of an event system, viewed from above;

FIG. 2: shows an example of an event furniture component which can be moved in space in the form of a table-chair combination;

FIG. 3: shows a schematic example of a table formation that can be realized with the event furniture components that can be moved in space from FIG. 2;

FIG. 4: shows an example of an interaction with a robot arm;

FIG. 5a: shows a cross section through one of the tables for 4 persons from FIG. 3 during a first phase of a possible supply of food;

FIG. 5b: shows a cross section through one of the tables for 4 persons from FIG. 3 during a second phase of a possible supply of food;

FIG. 6: shows a schematic example of a first table formation in which the event furniture components that can be moved in space from FIG. 2 are docked to a buffet module;

FIG. 7: shows a schematic example of a second table formation in which the event furniture components that can be moved in space from FIG. 2 are docked to a buffet module;

FIG. 8: shows an example of the use of a robot arm in the movement of event furniture components that can be moved in space or a table formation composed of said components;

FIG. 9: shows a schematic example of a table formation in which the event furniture components that can be moved in space from FIG. 2 are docked to a show cooking module;

FIG. 10: shows an example of the use of a robot arm in the supply of food to a table formation;

FIG. 11: shows a setup schema for a controller;

FIG. 12: shows an exemplary embodiment of an air cushion pad sealing element;

FIG. 13: shows a first variant of the event furniture component from FIG. 2; and FIG. 14: shows a second variant of the event furniture component from FIG. 2.

Identical objects are provided with the same reference numerals in all figures, unless otherwise mentioned. In order to increase the clarity of the figures, however, not all reference symbols are always entered in each figure.

FIG. 1 illustrates an exemplary restaurant system as an example of an event system 10 for an animated restaurant that is operated in a restaurant with a bar area 9, experience area 2, appetizer area 3, two areas for main courses 4, 5, a dessert area 6 as well as a sanitary area 7 and kitchen area 8 and can be operated, for example, with the theme "space travel".

The event system 10 has a number of distinctive features:

A first distinctive feature is that, in particular, the tables 11 together with associated chairs, which are symbolized as a rectangle in FIG. 1 and whose corresponding current number of places is entered in the rectangle, are formed by groups of event furniture components with movement means for a mechanical movement in space, each having a chair and a table by way of example, which table, in relation to a composite table 11 of which the event furniture part can be a temporary component, forms a table part. An exemplary embodiment of such an event furniture part is now explained in more detail with reference to FIG. 2:

FIG. 2 shows an example of an event furniture component 100 which can be moved mechanically in space and which in this case is designed as a chair 110 that is arranged together with a table or table part 120 on a base plate 130. The position of the chair 110 relative to the table or table part 120 can be changed by means of a supporting frame 111, to which a seat 112 with armrests 1121 and a movable backrest 1122 is connected via a quick coupling 1111 so that the seat 112 can be easily and quickly replaced using the attachment parts arranged thereon, for example when the theme of the event system is changed or when the target group is changed, for example when a children's birthday party has taken place in the afternoon and a speed dating event is to take place in the evening.

The supporting frame 111 has a sliding mechanism 1112 for sliding the chair 110 toward the table or table part 120 and away from the table or table part 120, a lifting mechanism 1113 for changing the seat height relative to the base plate 130, a rotation mechanism 1114 for rotating about an axis perpendicularly to the base plate 130, and a tilting mechanism 1115 which preferably realizes a tilting movement along a motion link in order to move the center of rotation to the position of the average body's center of gravity. Optionally, these mechanisms can also be driven, for example by electric motors, and can be controlled by means of a controller via wireless communication means.

In this exemplary embodiment, a device for sensory stimulation 1123 of a guest 1 of the animated event, which here by way of an example is a vibration element, is also accommodated in the seat 112 itself. This device for sensory stimulation 1123 is controlled by a first controller, for example via a wireless connection. The control is in particular synchronized with a mechanical movement of the event furniture component 100. This can be used in a variety of ways—for example, to accompany the mechanical movement, for example to give the impression of a bumpy slope during a driving movement, but also as a signal that a movement will soon take place for which the guest 1 should prepare.

In addition, a sensor 1124 for detecting the seat occupancy is also integrated in the seat 112, the data from which sensor can also be used by the controller, for example as part of a safety check before the mechanical movement is initiated, or in order to save effects in an empty space. An operating element 1125, which can also be designed as a sensor and the state of which is read out by the controller is arranged on the armrest 1122; said operating element can be used, for example, to acknowledge a movement or to signal that the guest 1 is now ready for an imminent movement.

Preferably, the armrests 1122 can also be moved in height and fully lowered, which allows content-specific requirements to be met and surprise effects to be evoked. To this end, a central guide with drive system can be integrated in the backrest.

The table or table part 120 has a tabletop 121, which is connected via a quick coupling 122 to a preferably height-adjustable stand 123, which is fastened on the base plate 130. In this embodiment, the tabletop 121 has a large number of components which, however, can also be used individually or in groups and are largely independent of one another.

For example, at the edges of the tabletop 121, transmitters and/or receivers 1211 can be arranged which enable the position and location of the event furniture component 100 in space to be determined and are preferably integrated into a navigation system, which in particular locates the positions of all event furniture components.

If such a navigation system is present, this locating process can also be supported by the signals from contact loops that run in the ground.

The edges of the tabletop 121 may also have distance sensors 1212, by means of which the coupling processes between different event furniture components 100 are monitored and/or have sensors 1213 as safety sensors, for example in the form of pressure sensors or optical sensors, which reliably prevent a part of a guest's body that is currently located in the edge area of a tabletop 121 from getting caught during a machine movement or indicate that the guest is ready for the next action or ensure—insofar as this is not already ensured by the transmitters and/or receivers 1211 in cooperation with the navigation system or in addition thereto as a redundant safeguard—that, when approaching another event furniture component, the speed of the movement is adapted in an adequate manner.

Moreover, means for generating special effects 1214, i.e., further devices for sensory stimulation, can be arranged indirectly or directly on the tabletop 121, e.g., LEDs, nozzles for releasing mist, moisture, vibration elements, or the like.

Displays 1215, 1216, which are preferably connected to or integrated into the tabletop 121, can also be arranged on the tabletop 121. These also represent further devices for sensory stimulation; they can inform or entertain the guest 1. If the displays 1215, 1216 are designed as a touch display, they can also serve as an input means and operating element for the guest 1, but separate operating elements 1217, such as a pullout control panel, can also be provided for this purpose.

On such a display 1215, 1216, at the assigned space, it may be possible in particular to retrieve personalized content that the guest voluntarily disclosed during registration. This can also be done in a synchronized manner.

Furthermore, a kind of Jude Box could be integrated in the area of the displays on or on the table, where certain variants which match the content, e.g., in the form of film, image, sound or light content, are stored and between which a selection can be made—optionally according to a majority decision of all guests.

Interactive game options can also be offered, in particular with relevance to the content in question, by means of which options the guest can then, for example, earn a reward. For example, the guest could be given the task of identifying and acknowledging certain hidden features in the content during the event, receive points in a bonus account, and then receive additional services in exchange for said points during the course of the event, e.g., an additional course or a special drink.

A housing 127 is arranged around the stand 123 and forms a protected technical room for components housed in its interior that are necessary for the operation of the event furniture part and, in particular, some of the components necessary for the mechanical movement.

The movement means for a mechanical movement can be categorized as follows.

Such means for a mechanical movement of an object and in particular a mechanically movable event furniture component can generally be categorized as follows.

Firstly, there are support means which bring the object to be moved into a position in which it can be moved without significant friction, or hold it in said position. Examples of such support means are wheels or (ball) casters, and air cushions, but they can also be realized by suitable magnetic systems. Obviously, this type of movement means is absolutely necessary for mechanical movement.

Secondly, there are drive means which produce the actual movement of the object to be moved. Depending on the design, these can also fulfill a function as support means or coincide therewith, as is the case, for example, with driven wheels, in particular friction or Mecanum wheels, or wheel axles. However, such drive means do not necessarily have to be arranged completely on the object to be moved, but at least one partial component to which a part of the drive means that is not arranged on the object to be moved is then coupled, for example in a magnetic system by means of a magnetic interaction or by means of a mechanical intervention, e.g., in a system with conveyor chains.

Thirdly, there are control means which specify to the drive means the movement to be executed. These can be present locally on the object to be moved or not on the object to be moved. In the first case, they can be designed in such a way that they act semi-autonomously, for example in the case of hall transport systems or in concepts for autonomous driving in vehicles. In the second case, the drive means receive the control commands from an external controller. Mixed cases are also possible, in which a subordinate controller is present locally on the object to be moved, but also receives and executes control commands from a higher-level controller not arranged on the object to be moved.

Fourthly, in all cases for implementing the synchronization according to the invention, generally at least one communication module is present on the object to be moved, by means of which control commands and data can be exchanged with another controller.

Fifthly, operating materials storage units and/or operating materials generators can also form a substantial component of the means for mechanical movement, for example, in a system with air cushions, a compressed air reservoir as an operating materials storage unit, and a compressor as an operating materials generator, or, for example, a storage capacitor (CAP), a super capacitor super CAP, a battery, or a rechargeable battery as an operating materials storage unit for the needs of a local, electrically driven drive means, a local controller, and/or the communication module or means for inductive current transmission as operating materials generation.

In the exemplary embodiment of a mechanically movable event furniture component 100 shown in FIG. 2, the support means 131 are provided on the bottom of the base plate 130 and can be designed, for example, as air cushion pads, magnets, ball casters, or the like.

In the case of the exemplary embodiment of a mechanically movable event furniture part shown in FIG. 2, the drive means is at least one electrically driven friction wheel 132, preferably a pair of electrically driven friction wheels 132, arranged so as to be rotatable about a preferably vertical axis, this rotational movement also being driven. This rotation is preferably realized at the quadrant point of the friction wheel 132. Independently of this, it is preferred if the rotation is realized with the highest possible resolution of angular increments.

In addition, there is a driven height adjustment mechanism 133 for the electrically driven friction wheel 132 or the pair of electrically driven friction wheels in order to enable a fine adjustment of the load distribution and the contact pressure. It is self-evident that the base plate 130 has an opening through which the friction wheels 132 are in contact with the floor. Of course, such an arrangement can be realized in the same way with Mecanum wheels.

The friction wheels 132, including their electric drive system and the height adjustment mechanism 133, are, together with an operating materials storage unit 134, specifically here a battery for the power supply of the electrical components and, in the case of using an air cushion or air cushion pad, a compressed air storage unit as well as local control means 135 and a communication module 136, which preferably operates wirelessly and establishes the signal communication with the controller 13, housed in the housing 127.

It is particularly preferred for the support means 131 to be designed as air cushions, in particular in conjunction with a drive means in the form of at least one friction wheel 132 or Mecanum wheel, the height of which can be adjusted by means of a height adjustment mechanism 133. Air from an operating materials storage unit 134, which has a compressed air storage unit, preferably in the form of a replaceable compressed air cartridge, is guided to openings in the base plate 130 via a corresponding line system (not shown). The openings, individually or in groups, are surrounded, on the side facing the floor, by air cushion pad sealing elements, the shape of which corresponds, for example, to the periphery of a rectangle, square, circle, or other geometric shape. Air cushion pad sealing elements 150, as shown in FIG. 12 in half cross section, are particularly preferable in this case.

The air cushion 140 comprising a sealing element 150, shown in FIG. 12, has a main body 155. A sealing lip 151 is arranged in the outer edge area of the main body 155 and is pressed against the floor 152 by the supply of compressed air when the air cushion 140 is activated, but is adapted to the particular floor covering—preferably a hard covering without recessed joints, such as a parquet floor—in such a way that the best possible sliding properties of the sealing lip 151 on the floor 152 are achieved, which can be verified on the basis of the friction coefficients that can be determined by means of experiments.

In addition, a support ring 153 that has a sliding lining, is separated from the sealing lip 151 and is preferably arranged further toward the next outer edge of the sealing element 150 is present on the main body 155, the internal pressure of which ring can be adjusted by inflating it separately with supplied compressed air or by letting out compressed air in a finely metered manner via a valve (not shown). Additional sealing ridges 154 can be arranged as a secondary seal on the bottom of the support ring 153.

As a result, the sealing element 150 enables pressures in the air cushion and support ring 153 to be controlled in a variable manner so that the ratio between air demand and sliding properties can be specifically controlled. Another parameter that can be used for adjustment is the height position of a height-adjustable drive means, in particular of friction wheels 132 or Mecanum wheels.

As FIGS. 13 and 14 illustrate, however, other event furniture components 200, 250, 300, 350 with means for mechanical movement that do not have both a seating option and a table component are also conceivable. Specifically, a variant with an event furniture component 200 is shown in FIG. 13 which differs from the event furniture component 100 in that it does not have a tabletop and accordingly the components arranged on the tabletop 121 of the event furniture component 100 are also omitted. For this purpose, the table—which can optionally also be an attachment part of a buffet device—is designed as a separate event furniture component 250 with means for mechanical movement—identical to the embodiment in FIG. 2—to which the separate chair, which forms the event furniture component 200, can be coupled by means of an optional coupling device 201.

The variant shown in FIG. 14 is particularly suitable for cases in which a bar-like atmosphere is desired, for example when an event such as speed dating is the theme of the animated restaurant. The event furniture component 300 is fundamentally identical to the event furniture component 100 and differs therefrom primarily with regard to the table height and the height of the chair. The event furniture component 350 has no seating option at all, only a (standing) table; the guest stands here on a base plate 350 while moving. However, the means for mechanical movement and the sensor system can each be implemented for both the event furniture component 300 and the event furniture component 350 in the same manner as described above for the event furniture component 100.

As a consequence of the fact that the event furniture components 100, 200, 250, 300, 350 are equipped with movement means for a mechanical movement in space, a first controller can control a movement, in particular of these event furniture components, in space. For example, a number of tables may be driven through the restaurant together and then split apart into other groups of tables with associated chairs 11 or reconfigure themselves.

A second distinctive feature of the event system 10 is that it has—shown here merely schematically—devices 12 for sensory stimulation of guests of the animated restaurant, which are here distributed to the different areas. In particular, this is realized here as a visual stimulation by means of projectors and supporting these visual effects with sound effects, as is evident in the following, but olfactory effects can also be achieved by releasing aromatic substances or haptic effects, e.g., vibrations, spray mist, air currents, or the like. The output of the sensory stimulation can be easily adjusted depending on the desired theme by using appropriate programming, and even an individualization of the content may be possible.

The third distinctive feature of the event system 10 is that movement of the event furniture components and sensory stimulation of the guests 1 arranged thereon are synchronized with one another by a component of a controller 13, which is also shown only schematically in FIG. 1, but is now explained in more detail with reference to FIG. 11.

In the embodiment FIG. of FIG. 12, the controller 13 is constructed in such a way that the first controller 1901, which is designed according to the invention to control the mechanical movement and the output of the device for sensory stimulation of guests of the animated restaurant in a synchronized manner, is formed by a master controller or main controller. This first controller 1901 is in signal communication with a number of subordinate controllers from which it receives data and to which it gives control commands, in particular:

a chair controller 1902, which controls the degrees of freedom of movement and special effects, such as the vibration of the chair 110 of the event furniture component 100, and which transfers sensor data from sensors arranged on the chair 110 to the first controller 901;

a table controller 1903, which controls the degrees of freedom of movement and special effects of the table or table part 120 of the event furniture component 100 and which transfers sensor data from sensors arranged on the table or table part 120 to the first controller 1901;

a light controller 1904, which controls the lighting and lighting effects in the different areas of the animated restaurant;

a fan controller 1905, which controls the locally and globally provided fans for circulating air and for producing haptic effects by means of the air flow;

a buffet controller 1906, which moves, in particular, event furniture components in the form of mechanically movable buffets, in space and which transmits their coordinates to the first controller 1901 for navigation;

a robot controller 1907, which moves, in particular, event furniture components in the form of mechanically movable robots, in space, which controls the interaction of said robots with guests and the environment, and which transmits their coordinates to the first controller 1901 for navigation;

a sound controller 1908, which generates and coordinates the sound effects when the animated restaurant is in operation;

a projection controller 1909, which generates and coordinates the visual effect, in particular the projections, when the animated restaurant is in operation;

a navigation controller 1910, which controls and monitors in particular the movement of the mechanically movable event furniture components 100;

a calibration controller 1911 THAT DOES WHAT???

an operator controller 1912, by means of which event employees can actively intervene in the progression of the animated restaurant via an operator unit and which also gives event employees information as to when specific operating materials are running low; and a docking station controller 1913, which controls the charging of the event furniture components 100 with electricity, compressed air, and/or other consumable materials by means of a docking station.

In order to make the operating principle of the event system 10 more understandable, an exemplary operation with the theme of "space travel" will now be described.

The guests first enter the bar area 1, which can be designed like a hangar of a spaceport, for example, and wait there with an aperitif until everyone has arrived and decided on a particular menu and the event furniture is ready for use.

Subsequently, a door opens to the experience area 2, and it can be suggested to the guests by projection in the bar area 1, for example by means of the device for sensory stimulation 12, that the door through which they are entering is the door of a spaceship.

In the section of the experience area 2 the guests have now entered, they will first find a table 11 with 12 places, which—and this does not necessarily have to be evident at first, but can even be concealed to achieve surprise effects, in particular by means of the device for sensory stimulation 12 using a suitable projection—actually consists of 12 individual event furniture components, e.g. the chair-table assemblies 100 which have been described above in detail in the context of FIG. 2 and can each be individually mechanically moved.

It should be noted that this area in particular is also well suited for providing docking stations 16 at which the event furniture components are supplied with operating materials such as electricity in the form of charging a rechargeable battery, compressed air, operating materials for special effects, and the like; firstly, because it can be ensured at the beginning of the event that the operating materials necessary during the course of the event are available and, secondly, because at this point the event furniture components usually remain in one place for quite a while.

After all the guests have sat down and an acknowledgment signal has been given, a countdown 14 begins to run down, which ends with a rocket launch simulated by the device for sensory stimulation 12 in the experience area 2.

During the rocket launch, the device for sensory stimulation 12 in the experience area 2 of the table 11 with 12 places is set in motion to a corresponding acoustic accompaniment, for which purpose the twelve individual event furniture components are moved jointly and synchronously through the experience area 2 by means of the controller 13. In synchronization with this movement, the controller 13 causes the device for sensory stimulation 12 in the experience area 2 to project moving images onto the walls of the experience area 2 in order to create the impression of the rocket movement. In addition, a background soundtrack can be provided by sound effects.

A particularly convincing perception can be created when mechanically moving wall, partition or privacy elements 15 with windows are moved by the controller synchronously with the table 11 with 12 places so that the moving projection on the walls of the experience area 2 is followed through the windows, thus further enhancing the impression of being stationary in a spaceship.

Furthermore, further effects can be produced by the same or another device for sensory stimulation 12 in order to enhance the experience of space travel. For example, vibration means arranged in the chairs of the event components can be vibrated by the controller during the start sequence.

At the end of the factitious "space flight", arrival at a space station can be projected, for example. A mechanically moving wall element 15 is lowered into the floor and the appetizer area 3, which is designed as a different hangar, opens up to the view of the guests. To the astonishment of said guests, the table 11 for 12 persons, at which they have until now sat together, now begins to divide, and the individual event furniture components 100 independently perform mechanical movements under the control of the controller 13, which in the end cause said components to become, for example, four tables 11 for four persons, which have configured themselves by means of mechanical movement at predetermined points in space, each from four event furniture components 100 as shown in FIG. 2, i.e. a configuration as sketched by way of example in FIG. 3. Of course, other groupings are also possible.

The manner in which this configuration is created can be determined in different ways. For example, it can be based on an order previously placed, for example in the bar area 1, so that the persons who want to eat the same appetizer end up at the same table for multiple people or the number of different appetizers present at each table is maximized.

A variant that is very appealing from an experience point of view can consist in the grouping of the event furniture components being preceded by an interaction with another mechanically movable event furniture component in the form of a robot or robot arm 400, as is now described in more detail with reference to FIG. 4.

FIG. 4 shows two examples of mechanically movable event furniture components 100, as described above in the context of FIG. 2, in an interconnected state and with a guest 1 arranged thereon. Furthermore, another event furniture component can be seen in the form of a robot or robot arm 400 suspended from a guide rail 401 with the aid of its driven automated drive unit as a movement means 402 for executing a mechanical movement.

In principle, such a robot or robot arm 400 can also travel on the floor, but the embodiment in which it is suspended from the guide rail 401, which belongs to a rail system, has the advantage that the already complex control of the mechanically movable event furniture components 100 is not further simplified by additional event furniture components moving on the floor, which do not necessarily have to be present there.

The robot or robot arm arrives in response to a command from the first controller 901 and begins interaction with the guests 1. In particular, a voice interface, as is known from computer assistance systems such as Siri or Alexa, can be used in order to analyze the results of the interaction and, if necessary, to translate them into actions—for example during an ordering process.

This can proceed, for example, as a kind of access control for entering the space station, carried out by the robot or robot arm 400, in which the robot or robot arm 400 queries specific preferences and the controller 901 determines or calculates the configuration of the mechanically movable event components 100 on the basis of this query so that, for example, persons who are initially unknown to one another but have similar interests or professional backgrounds are brought together at a given table configuration. However, it is also possible to carry out the ordering process at this juncture by interacting with the robot or robot arm.

At this point it should be mentioned that, even if not constantly mentioned explicitly, a sensory accompaniment of the experience and/or embedding of the restaurant visit in a story or a theme can be continued by the respective devices for sensory stimulation 12, for example by projecting images, sound effects, vibrations and other haptic experiences, or generating smells.

After a given table configuration has been brought about, the appetizer can then be provided in the appetizer area 3. In principle, this can be done by event personnel or also by robot arms, but another very intriguing variant consists in making the food appear on the table from above or from below, effectively from the table, as is explained in detail using the example of FIGS. 5a and 5b.

FIG. 5a shows two examples of mechanically movable event furniture components 100, as described above in the context of FIG. 2, in an interconnected state and with a guest 1 arranged thereon. Furthermore, it is possible to see, in the interior, which is formed by the housings 127, a means for the automated provision of food 501, realized as a prop that can be driven out of an opening in the floor, and on which a buffet container 502 is arranged, in each case containing the selected appetizer of the guests 1.

In order to actually bring the appetizer onto the table or table part 120, the mechanically movable event furniture components 100 slide apart by an imperceptible distance, as shown in FIG. 5b, such that the retractable prop with the buffet container 502 arranged thereupon can be extended to the level of the tabletops 121 and the food in the buffet container 502 can be accessed by the guests 1.

However, it is also possible to arrange the buffet container in the event furniture component right from the start and then to let said container appear on the tabletop using a lifting mechanism belonging to the event furniture component.

This procedure is particularly effective if the food is provided while the device for sensory stimulation 12 is distracting the guests' attention.

For example, a view along a part of the space station into space could be projected onto a wall of the appetizer area. Suddenly, a point begins to move in this image, whereupon the guests 1 are alerted by an audible message: "Intruder alert! Intruder alert!". In addition, the first controller 901 automatically turns the chairs 110 so that the guests can see the moving point when they look straight ahead. The point gets bigger and bigger and turns out to be an alien spaceship. Laser guns open fire on the spaceship, which fires back and continues to bear down on the space station. The spaceship gets hit and loses control. An audible warning "Impact! Impact" sounds, and the spaceship collides with the projected part of the space station, while at the same time a vibration is simulated by the vibration modules of the chairs and this moment is used to move the mechanically movable event furniture components 100 apart and provide the appetizer. After a large explosion accompanied by visuals, sounds, and vibrations, the chairs 110 are returned to their basic position on the instruction of the first controller 1901 to the chair controller 1902, and the guests are surprised to find their appetizer on the table.

It should be noted that, not least because of the fact that the entire visit to the animated restaurant may take longer, the need to visit the toilet must also be taken into account, for which reason the sanitary area 7 is provided. Because of the mechanical movements of event furniture components, it is preferred if, when seeking out the sanitary area 7, the movement to said area also takes place while the guest 1 is arranged on an event furniture component. The guest 1 can initiate a visit to the toilet, for example by registering a corresponding need on a control tablet. The controller then calculates a suitable time and path and controls the mechanical movement of the corresponding event furniture component, it also being possible to take into account the current occupancy status of the sanitary area 7 so that waiting times in the line for the toilets can be minimized. However, going to the sanitary area 7 should preferably take place during the consumption phases in the areas 3, 4, 5 or 6 and not in the transition phases between the stays in these areas.

Once the appetizer has been consumed, the tables 11 or the event furniture components from which they are composed, reset themselves independently, i.e. controlled and choreographed by the controller 13, so that synchronization with the output of the device for sensory stimulation 12 takes place—for example in a form of locomotion that is adapted to the type of background musical accompaniment, e.g. in rotational movements with waltz sounds—in a movement to the next area, the first area for main courses 4.

In principle, this can be done after the dishes and cutlery used have been removed—by personnel, robots, or elevator equipment. Another entertaining possibility is that the event furniture components first enter a sector of the kitchen area 8 in order to return, in a quasi automated manner, the dishes and cutlery used. While the guest is moving with the event furniture part into this area, a film which augments the perceived reality can be projected in said area, for example by means of the device 12 for sensory stimulation. For example, the used plates could be placed on a real conveyor belt by a real gripper arm, which disappears into a projection screen, but which is continued in the projection into a kitchen run by aliens, where, for example, a food monster takes plates from the conveyor belt, pours leftovers into its mouth, and then hands the plate over to another alien type, which licks it with an oversized tongue, and then places it on a conveyor belt with "clean" plates.

The event furniture component 100 then travels past such a conveyor belt with clean plates, which belt emerges from the projection screen, and the guest 1 is prompted acoustically and/or visually to take one of these plates—which, for example, could also still have a slightly moist or slightly slimy surface, an unusual temperature, and/or a strange smell, in order to create points of reference for the "cleaning" of the plates by the aliens in the film—from the conveyor belt when the first area for main courses 4 is operated as a buffet area. This illusion is particularly strong if the guests receive individually distinguishable plates and the plate taken from the conveyor belt looks exactly like the one that was handed in.

The event furniture component then travels to a buffet element and docks therewith. Possible example configurations of the event furniture components for a first area for main courses 4 operated in a buffet mode are shown in FIGS. 6 and 7.

In the configuration shown in FIG. 6, two event furniture components can be seen in the form of hexagonal buffet tables 600, to each side of which a mechanically movable event furniture component 100 is docked. For this purpose, but not necessarily, the event furniture components 600, which are configured as buffet tables, themselves each have movement means for carrying out a machine-controlled movement, which makes it possible, while the guests 1 are in a different area, to drive the event furniture components 600 configured as buffet tables in a machine-controlled manner into a section of the kitchen area 8 and refill them there for the next guests.

In the configuration shown in FIG. 7, an event furniture component 700 configured as a sushi belt can be seen, on each side of which six mechanically movable event furniture components 100 are docked. In this example, but not necessarily, the event furniture component 700, which is configured as a sushi belt, has movement means itself for carrying out a machine-controlled movement, which makes it possible, while the guests are in a different area, to drive the buffet tables in a machine-controlled manner into a section of the kitchen area 8 and refill them there for the next guests.

For the sake of completeness, it should be pointed out that it is of course also possible to move an event furniture component 600, 700 together with the event furniture components 100 docked thereto.

This process can also be enhanced by action elements, for example if, embedded in the output of the device for sensory stimulation 12, the buffet elements themselves have means for carrying out a mechanical movement, move in space, and have to be "captured" by the event furniture components 100 with chair 110 and table or table part 120, which then gradually dock. Alternatively, tables can first be formed from the event furniture components, which then move apart when buffet tables or sushi belts arrive and take them into their center.

After the first main course has been consumed at the buffet in the first area for main courses 4, the sequence proceeds to the second area for main courses 5. The mechanical movement of the event furniture components to that point can be synchronously accompanied or controlled, for example, as will now be explained in more detail with reference to FIG. 8, by an event furniture component in the form of a robot or robot arm 800, which is preferably guided on a rail system mounted on the ceiling.

FIG. 8 shows two examples of mechanically movable event furniture components 100, as described above in the context of FIG. 2, in an interconnected state and with a guest 1 arranged thereon. Furthermore, another event furniture component can be seen in the form of a robot or robot arm 800 suspended from a guide rail 801 with the aid of its driven automated drive unit as a movement means 802 for executing a mechanical movement. The robot or robot arm 800 arrives in response to a command from the first controller 1901 to the robot controller 1907 and brings a probe 803 close to the tables or table parts 120 of the connected, mechanically movable event furniture components 100.

The first controller 1901 then controls the robot or robot arm 800 simultaneously and synchronously via the robot controller and the mechanically movable event furniture components 100 via the navigation controller 1910 in such a way that the guests get the impression that their movement is caused by the robot or robot arm 800, which, of course, they cannot explain since no interaction or coupling can be identified (and actually does not exist).

Also shown is an event employee 99 with an operator unit 98 which allows the first controller 1901 to be influenced via the operator controller 1912 in order to be able to intervene immediately in dangerous situations that can be identified or foreseen by humans.

The movement apparently induced by the robot or robot arm 800 can in particular also pass again via the kitchen area 8, where, for example, depending on the order placed, it docks with one of multiple show cooking stations, as is shown by way of example in FIG. 9.

FIG. 9 shows an event furniture component 900 in the form of a show cooking station 900, at the center 901 of which the chef is located and four mechanically movable event furniture components 100 are docked with each side of the station. The guests 1 seated at said station can then follow the preparation of their dishes directly, or at least the final phase thereof, the plates then arriving to the tables or table parts 120 completely fresh. After receiving the prepared meal, the event furniture components 100 continue to travel in a machine-controlled manner to the second area for main courses 5, where they then configure themselves again with other event furniture components to form a table 11 for a specific number of persons.

After this course has been consumed, the event furniture components then move to the dessert area 6, where they reassemble to form a large table 11 for 12 persons. The dessert can be served—as a buffet 1003 in a mechanically movable event furniture component 1004 in the form of a buffet module or served individually—by a mechanically movable event furniture component in the form of a robot or robot arm 1000, as shown in FIG. 10, which is suspended from a guide rail 1001 belonging to a rail system such that it can be moved by a movement means 1002 in the form of an automated drive unit. During or after completion of the consumption of the dessert, the device 12 for sensory stimulation can project the return to Earth onto the walls of the dessert area 6. After that, the space travel experience is over, and the guests are released back to lobby area 9, where they can of course have a drink while they process their adventure and the many unique sensations they have experienced.

LIST OF REFERENCE NUMERALS

1 Guest
2 Experience area
3 Appetizer area
4, 5 Area for main courses
6 Dessert area
7 Sanitary area
8 Kitchen area
9 Bar area
10 Event system
11 Table
12 Device for sensory stimulation
13 Controller
15 Wall, partition, or privacy element
16 Docking station
98 Operator unit
99 Event employee
100 Event furniture component
110 Chair
111 Supporting frame
112 Seat
120 Table or table part 121 Tabletop
122 Quick coupling
123 Stand
127 Housing
130 Base plate
131 Support means
132 Friction wheel
133 Height adjustment mechanism
134 Operating materials storage unit
135 Control means
136 Communication module
140 Air cushion
150 Sealing element
151 Sealing lip
152 Floor
153 Support ring
154 Sealing ridge
155 Main body
200 Event furniture component
201 Coupling device
250 Event furniture component
300 Event furniture component
350 Event furniture component
400 Robot or robot arm
401 Guide rail
402 Movement means
501 Means for the automated provision of food
502 Buffet container
600 Event furniture component
700 Event furniture component
800 Robot or robot arm
801 Guide rail
802 Movement means
803 Probe
900 Event furniture component
901 Center
1000 Robot or robot arm
1001 Guide rail
1002 Movement means
1003 Buffet module
1111 Quick coupling
1112 Sliding mechanism
1113 Lifting mechanism
1114 Rotation mechanism
1115 Tilting mechanism
1121 Armrest
1122 Backrest
1123 Device for sensory stimulation
1124 Sensor
1125 Operating element
1211 Transmitter and/or receiver
1212 Distance sensor
1213 Safety sensor
1214 Means for generating special effects
1215, 1216 Display
1217 Operating element
1901 First controller
1902 Chair controller
1903 Table controller
1904 Light controller
1905 Fan controller
1906 Buffet controller
1907 Robot controller
1908 Sound controller
1909 Projection controller
1910 Navigation controller
1911 Calibration controller
1912 Operator controller
1913 Docking station controller

The invention claimed is:

1. Event furniture comprising:
a plurality of event furniture components (100, 200, 250, 300, 350), wherein each of the event furniture components (100, 200 250, 300, 350) comprises at least one table and/or at least one chair,
wherein, for each of the event furniture components (100, 200, 250, 300, 350), the at least one table (11, 250), a table part (120, 300, 350) of the at least one table (11), the at least one chair (110, 200) and/or a combination thereof have means for carrying out an individual machine-controlled movement,
wherein the means for carrying out an individual machine-controlled movement selectively and controllably moves each of the event furniture components (100, 200, 250, 300, 350) with respect to a floor on which each of the event furniture components (100, 200, 250, 300, 350) is supported, and
wherein movement of each of the event furniture components (100, 200, 250, 300, 350) with respect to the floor is separate from, and is coordinated with respect to, the movement of other ones of the event furniture components (100, 200, 250, 300, 350).

2. The event furniture according to claim 1,
characterized in that at least one of the event furniture components comprises a table (11) that is composed of or can be composed of a plurality of table parts (120, 300, 350) and chairs (110, 200) assigned to said table (11).

3. The event furniture according to claim 2,
characterized in that at least some of the table parts (120, 300) are each connected to at least one of the chairs (110) assigned to the table (11) in such a way that the at least some of the table parts (120, 300) and the chair (110) connected thereto form a unit as one of the event furniture components (100), which can be moved together in space, and that multiple ones of the event furniture components (100) have the means for carrying out an individual machine-controlled movement so that the table parts (120, 300) and the chairs (110) connected thereto can be reconfigured to form a plurality of tables (11) or a table composed in a different way (11).

4. The event furniture according to claim 3,
characterized in that at least one of the chairs (110) is arranged such that it can move relative to the at least some of the table parts (120) to which the at least one of the chairs (110) is connected.

5. The event furniture according to claim 4,
characterized in that the movement of the chair (110) relative to the table part (120) in the case of at least one of the event furniture components (100) contains a drive component and in that drive means for this movement are arranged on the event furniture component (100).

6. The event furniture according to claim 2,
characterized in that at least one chair (110) and/or at least one table (120) of one of the event furniture components (100) on the event furniture component (100) is connected to the event furniture component (100) via a quick coupling (1111, 122).

7. The event furniture according to claim 1,
characterized in that there are two or more table parts which can be positioned so as to partly overlap one another in at least one configuration of the event furniture.

8. The event furniture according to claim 1,
characterized in that at least one sensor (1124, 1213) is arranged on at least one table (120) and/or on at least one chair (110), which sensor is configured and designed to detect the presence, the current position, and/or a movement of a guest (1) or of another event furniture component (100, 200, 250, 300, 350).

9. The event furniture according to claim 1,
characterized in that at least one device for sensory stimulation (1123, 1214) of a guest (1) sitting at the table (120) or on the chair (110) is arranged on at least one table (120) and/or on at least one chair (110).

10. The event furniture according to claim 9,
characterized in that the device for sensory stimulation (1123, 1214) is operated in synchronization with the machine-controlled movement.

11. The event furniture according to claim 10,
characterized in that a global device (12) for sensory stimulation is present, which is also controlled by an external controller (13).

12. The event furniture according to claim 11,
characterized in that operating devices (98) which are in signal communication with the external controller (13) provide intervening control of the external controller (13), the operating devices (98) being available to event employees (99).

13. The event furniture according to claim 1,
characterized in that the event furniture further comprises at least one buffet device (600, 700) which has means for carrying out an individual, machine-controlled movement.

14. The event furniture according to claim 1,
characterized in that the event furniture further comprises at least one wall, partition, or privacy element (15) which has means for carrying out an individual, machine-controlled movement.

15. The event furniture according to claim 1,
characterized in that the event furniture further comprises at least one docking station (16) for supplying energy and/or operating material to components of the event furniture which have means for carrying out an individual, machine-controlled movement.

16. The event furniture according to claim 1,
characterized in that the means for carrying out the machine-controlled movement comprise at least one air cushion (140).

17. The event furniture according to claim 16,
characterized in that the air cushion (140) has a sealing element (150) comprising a main body (155) and comprising a sealing lip (151) which is arranged movably on the main body (155) such that it is pressed against the floor (152) when the air cushion (140) is activated.

18. The event furniture according to claim 1,
characterized in that the means for carrying out the machine-controlled movement comprise a rail system.

19. The event furniture according to claim 1,
characterized in that there is more than one friction wheel (132) or Mecanum wheel and that the friction wheels (132) or Mecanum wheels are selectively controlled by software, the software selectively controlling the means for carrying out an individual machine-controlled movement.

20. The event furniture according to claim 1,
characterized in that a drive system or an operating materials storage unit (134), which can in particular ensure the energy supply, or a local control means (135) or a communication module (136) or a combination of these assemblies on at least one event furniture component (100) comprising means for carrying out an individual machine-controlled movement are provided.

* * * * *